United States Patent [19]
Schroeder

[11] 3,939,453
[45] Feb. 17, 1976

[54] DIAGNOSTIC DISPLAY FOR MACHINE SEQUENCE CONTROLLER

[75] Inventor: Roger L. Schroeder, Springfield, Vt.

[73] Assignee: Bryant Grinder Corporation, Springfield, Vt.

[22] Filed: Apr. 29, 1974

[21] Appl. No.: 465,334

[52] U.S. Cl.... 340/172.5; 235/151.11; 235/153 AC
[51] Int. Cl.² ........................................ G06F 15/46
[58] Field of Search ......... 340/172.5; 318/563, 565; 324/73 PC, 73 AT, 51, 52; 317/101 B, 101 C; 235/153 AC, 151.11

[56] References Cited
UNITED STATES PATENTS

| | | | |
|---|---|---|---|
| 3,497,685 | 2/1970 | Stafford et al. | 235/153 AC |
| 3,631,229 | 12/1971 | Bens et al. | 235/153 AC |
| 3,701,113 | 10/1972 | Chace et al. | 235/151.11 X |
| 3,714,403 | 1/1973 | Ammann et al. | 235/153 AC |
| 3,719,931 | 3/1973 | Schroeder | 340/172.5 |

*Primary Examiner*—Joseph F. Ruggiero
*Attorney, Agent, or Firm*—Thomas N. Young

[57] ABSTRACT

A sequence controller for an automatic grinding machine or the like for controlling a sequence of machine functions and for providing a display of digital information which explicitly directs an operator through manual or semi-manual functions and which also provides diagnostic information. Diagnostic information is displayed on two levels, the first level is defined as "input code" which represents signals generated by a programmable controller to define the machine requirements due at any given time. These signals are normally compared with "requirements met" signals from input devices to determine whether or not the sequence should be advanced. The second level of signals are termed "cycle step commands" which represent signals sequentially generated in the controller to actuate specific machine functions. The controller may advance sequentially or non-sequentially. Circuit boards are correlated in physical location to cycle step command codes.

22 Claims, 4 Drawing Figures

DIAGNOSTIC DISPLAY FOR MACHINE SEQUENCE CONTROLLER

INTRODUCTION

This invention relates to machine function sequence controllers for semiautomated machines and particularly to a controller which provides multilevel diagnostic and operator-directive information.

BACKGROUND OF THE INVENTION

Many large and relative complicated machines, such as milling machines, grinders, and the like, require highly-skilled operators to properly organize and execute the various machine functions necessary to the realization of satisfactory end results. In a grinder or multiaxis milling machine, care must be taken to avoid possible physical interference between working elements having catastrophe potential and to otherwise properly program the sequence of machine functions so that the particular machine produces its best performance. Accordingly, automatic sequencers have been developed to relieve the operator of some portion of the responsibility for machine function programming.

Such sequencer devices typically involve a fair amount of complicated control circuitry which must be properly interfaced with mechanical and other electrical components in the controlled machine. Accordingly, malfunctions can occur not only in the machine itself, but also in the control system, the net result being the complication and aggravation of an already difficult problem of machine malfunction diagnosis.

One approach to machine malfunction diagnosis is disclosed in U.S Pat. No. 3,719,931, issued Mar. 6, 1973, on an "Apparatus For Controlling Machine Functions". That patent discloses a sequence controller for industrial machinery, such as a grinder, and including a solid-state sequencer which operates as a logical stepping switch. The controller further comprises two programmable matrices for producing output signal combinations of selected permutations in response to sequencer inputs, one matrix being arranged to control the actual execution of machine functions and the other being arranged to produce coded inputs to a comparator thereby to indicate machine function requirements which are due. Additional means are provided to generate input signals as machine functions are actually carried out and, accordingly, the comparator produces an output signal to advance the sequence only as the requirements due are actually met. Paired lights on a control-display panel indicate the machine status during any running sequence. Accordingly an operator, in the event of a machine malfunction, may look at the paired light display to determine whether a machine requirement due has not been properly met or that some machine function has been executed in advance of its proper point in the sequence. Either way, the operator is given at least some information which is of value in diagnosing a machine malfunction.

BRIEF SUMMARY OF THE INVENTION

In accordance with the present invention, a sequence controller for a complex multifunction machine is provided for programming and controlling a sequence of machine functions and, in addition, for providing conveniently displayed information which explicity directs an operator through manually or semimanually performed functions and which also provides diagnostic information. As hereinafter set forth in greater detail, the preferred embodiment of the invention comprises a numeric display which at all times provides operator directive and/or diagnostic information to the operator. This is usable in combination with a look-up table of specific advisories giving further information with respect to the numeric display to (a) instruct the operator with respect to machine functions which he must perform and (b) to point the operator to specific portions of the machine controller for trouble-shooting and diagnostic assistance.

In accordance with the invention, diagnostic information is displayed on two levels, the first of which relates to what are typically broadly defined machine functions or functional requirements which are due at any given point in the programmed sequence. These coded representations are hereinafter referred to as "input code" representations and are typically generated by a programmable sequence controller, such as a read only memory to generate the "requirements due" signals for advancing or preventing the advance of the sequencer much as is described in my aforementioned U.S. Pat. No. 3,719,931. At the operator's election, however, a second level of diagnostic information is displayed, this level corresponding to the actual specific cycle step commands which are sequentially generated in the controller to actuate specific machine functions. In the illustrative embodiment hereinafter described in greater detail, the numeric display continues to display the last input code representation which is received by it even though the programmer may have advanced through one of sequentially organized cycle steps which follow a given input code and which are involved in the actual execution of the functions which are implicit in the input code. Thus, the operator, if he is not fully advised by the input code of the source of a malfunction, may selectively display the cycle step command last generated. Since the controller has not advanced, the operator can immediately conclude that the last cycle step command generated (and displayed) has not been executed. This is of substantial assistance in malfunction diagnosis.

In accordance with a still further feature of the invention, the cycle step command and input code information which is displayed not only correlates with a location, number, page, or series of pages of numerically arranged advisories, but also correlates with circuit card organization in the physical circuit support system for the controller electronics. More specifically, the various electrical components and subsystems of the controller are placed on circuit cards or the like which are arranged, for example, biaxially, to produce a coordinate location code which is either directly or indirectly related to the numeric display. Accordingly, the numeric display leads the operator or trouble-shooting technician directly to the physical source of the machine malfunction. As hereinafter described with reference to the preferred embodiment of the invention, active subsystems and circuit arrangements on the circuit cards are equipped with lamps to display the actual status of the circuit such that the operator or trouble-shooting technician, once he has located the specific circuit card, can immediately tell whether the card or circuit on the card is defective or operative. This provides the operator or technician with further information as to whether the malfunction lies in the controller or in the mechanical components of the machine itself.

The preferred embodiment of the invention is more fully described in the following specification which is to be taken with the accompanying drawings as representative of the best known mode of practicing the invention. It is to be understood, however, that the preferred embodiment is only illustrative and that the invention may be embodied in other physical and electrical arrangements as required by the specific application thereof.

DETAILED DESCRIPTION OF THE SPECIFIC EMBODIMENT

Figure 1:
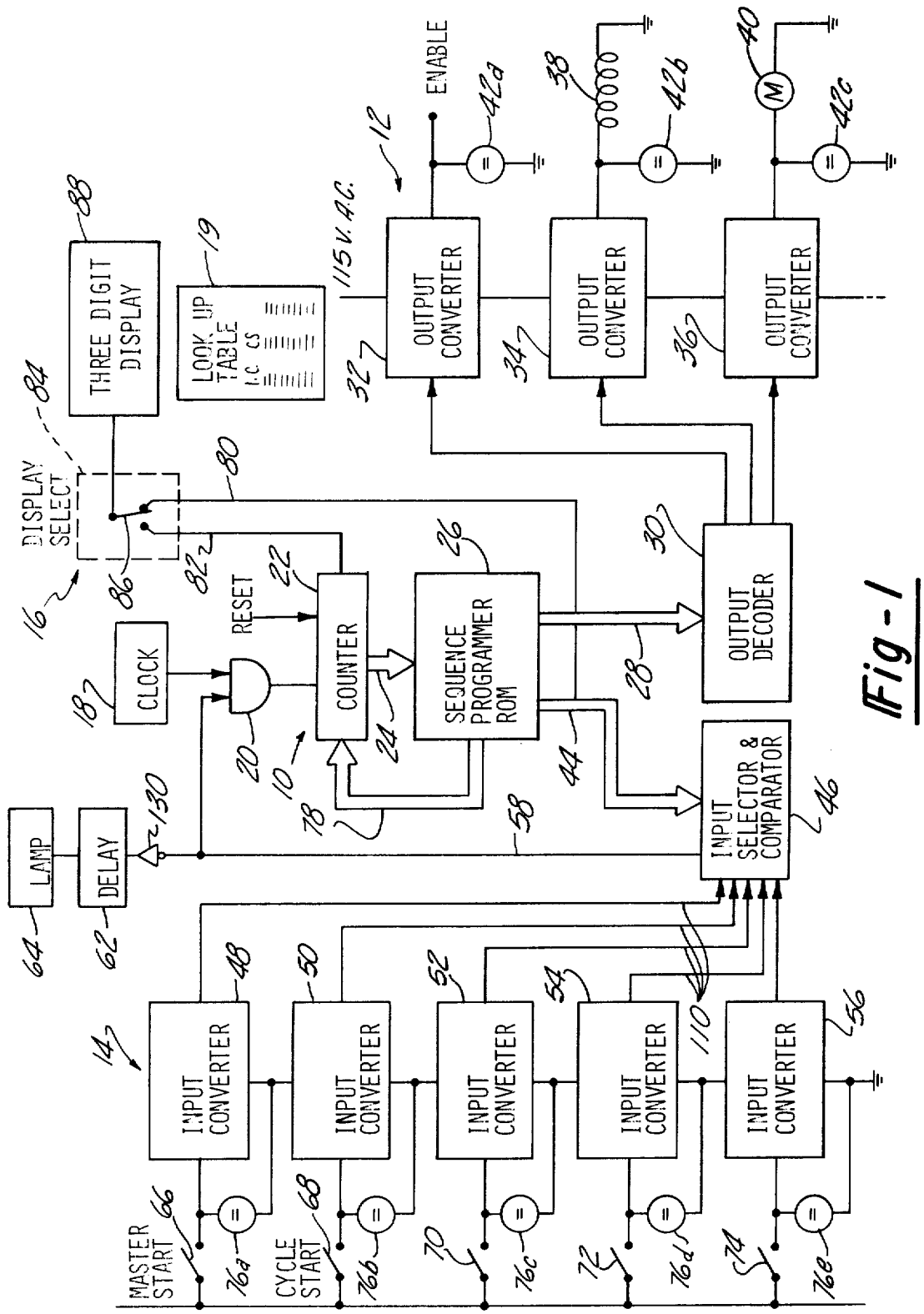
FIG. 1 is a block diagram partly in schematic detail of a sequence controller embodying the present invention.

Referring to FIG. 1 there is shown a sequence controller for a large industrial grinding machine, such as the Bryant "Centa-Lign" manufactured by the Bryant Grinder Corporation of Springfield, Vermont. While a large industrial grinding machine is given as an illustrative embodiment, it is to be understood that the sequence controller, as shown in FIG. 1 and as generally described herein, can be applied to many other multifunction industrial machines. The sequence controller of FIG. 1 comprises a sequence command section 10 which generates several classes of digitally coded control signal sequences defining the specific functional and analytical steps to be performed in the course of a grinding operation. The sequence controller further comprises an output section 12 which is connected to receive a sequence of output signals representing specific machine functions to be actuated and to perform those functions by way of specific output function generators. The sequence controller further comprises a feedback signal generator section 14 which responds to the performance of specific machine functions to produce signals representing performance or nonperformance, as the case may be, and for transmitting these signals back to the sequence control section 10 to control the advance of the sequence; i.e., the sequence is advanced only as long as the required functions designed by the output code signals are being performed in a timely and proper fashion. The sequence controller further comprises a display section 16 which provides specific advisories to an operator regarding functions to be performed and which further provides diagnostic information in the event of a malfunction.

The sequence control section 10 comprises a fixed frequency clock 18 to provide basic timing signals. Clock 18 is connected through a coincidence gate 20 to an ordinary digital counter 22 to advance the counter at the clock rate but only if the machine functions being called for are performed. The counter 22 produces at the outputs 24 thereof a parallel digital representation hereinafter referred to as a cycle step command, these commands representing the specific machine cycle steps which are to be executed in a sequential fashion. Typically the counter is advanced digitally from 000 to 001, 002, 003, and so forth in a numerically sequential fashion. It is possible, however, as hereinafter described for the counter 22 to jump to certain specified subroutines having digital cycle step commands which are numerically nonsequential; i.e., out of numerical order with respect to the cycle step commands just previously being executed. Following such a numerically nonsequential subroutine, counter 22 jumps back to the sequential numerical order to be advanced by clock 18 as the commanded cycle steps are performed.

Output bus 24 of counter 22 is connected to a sequence programmer 26 which may be implemented in the form of an electronic read-only memory. The sequence programmer 26 responds to the numerical cycle step commands from the counter 22 to generate a numerically more complex sequence of specific codes including output codes which are applied by way of multiconductor bus 28 to an output decoder 30. The function of the output decoder is to decode the multibit output codes received from the sequence programmer 26 and to select for actuation one of the several output channels represented in FIG. 1 by output converters 32, 34, and 36. It is to be understood that many more than three output channels are found in the typical controlled machine since there are more than three controlled machine functions. The output converters 32, 34, and 36 function to increase the electrical signal power level from the output decoder 30 to a higher power level for actuation of an output function controller, such as solenoid coil 38 or motor 40.

The output converters are more fully described in my previously issued U.S. Pat. No. 3,719,931. Each of the output converters 32, 34, and 36 has associated therewith a small neon lamp 42a, 42b, and 42c, respectively, which is lighted as the output converter associated therewith is selected for actuation by the programmer 26 and the output decoder 30. As hereinafter described, the output converter electronics are typically placed on a single circuit board along with the associated neon lamp 42 so that at any time the lighted or unlighted state of the neon lamp represents the actuated or nonactuated state of the associated output converter.

Sequence programmer 26 also produces a sequence of input codes. The input codes may be thought of as generalized machine function advisories which are produced in an intermittent fashion, many input codes being immediately followed by a subsection of one or more numerical cycle step commands representing specific machine steps to be executed within the broad category or subroutine represented by the initial input code. The input codes are applied via cable 44 to unit 46.

The encoder portion encoder-comparator 46 is also connected to receive feedback signals representing the status of certain machine functions from input section 14. This section comprises a plurality of power step-down devices in the form of input converters 48, 50, 52, 54, and 56. Whereas the output converters of section 12 are typically employed to step up from a 5-volt dc logic level to a 115-volt ac power level, the input converters of section 14 are used to step down from the 115-volt ac level to the 5-volt input logic level. These numbers are given purely by way of example.

Each input converter in section 14 has associated therewith a signal generating device, such as hard contact push-button switches 66 and 68 and hard contact limit switches 70, 72, and 74. In the embodiment of FIG. 1, push-button switch 66 is a "master start" switch which, through input converter 48, is capable of satisfying one of the early running conditions in any typical grinding operation. Switch 68 is shown in FIG. 1 as a "cycle start" button and, in accordance with the program of sequence programmer 26, must typically be depressed to restart any sequence of part production. Switches 70, 72, and 74 may be taken as representative of machine element position measuring limit switches, rotation switches, speed sensors, pressure sensors, etc. Each input converter 48, 50, 52, 54, and 56 has associated therewith a small neon indicator lamp 76a, 76b, 76c, 76d, and 76e, respectively, indicating the actuated or nonactuated status of the input channel represented by the associated input converter. Again, the specific nature of the input converters in section 14 are more fully described in my U.S. Pat. No. 3,719,931. All of the input converters are connected via lines 110 to the encoder-comparator 46.

As previously described, the sequence programmer 26 produces a sequence of input codes on cable 44 which are presented to the input selector portion of comparator 46 to represent a sequence of machine function requirements which are being called for at given times. Conversely, the signals produced by the input converters 48, 50, 52, 54, and 56 are applied to the input selector portion of encoder comparator 46 where they represent the machine functions that are actually met; i.e., executed in or by the machine. The input code from programmer 26 is compared to the "requirements met" code from the encoder and, if the signals match to indicate that the required functions have been performed, an "advance" signal is produced on line 58 and applied to the coincidence gate 20 to advance the counter 22 upon the occurrence of the next clock signal from clock 18. In this fashion, the entire sequence is advanced only as the functions required are met. If no advance signal appears on line 58 for a predetermined time, the signal applied to a delay device 62 through an inverter 130 lights a lamp 64 which may be located on the machine to signal the fact that the machine requires attention. Delay 62 may be a suitably timed monostable multivibrator or "one-shot" device.

Sequence programmer 26 generates not only the output codes on line 28 and the input codes on lines 44, but also a subroutine address code on line 78 in the form of a sequence of cycle step commands which are applied to the counter 22 whenever it is necessary or desirable to execute a subroutine having cycle step commands which are out of the normal numerical sequence generated by the signals from clock 18. Counter 22 is capable of temporarily storing the last generated numerically sequential cycle step command while the subroutine cycle step commands are generated and executed. The last generated numerical cycle step command is then retrieved from temporary storage, incremented by one, and placed back in the main counter portion for ongoing sequence control. The subroutine cycle step commands appear on line 78 which is connected between the programmer 26 and the counter 22.

Looking now to the display section 16, the input codes are applied by way of line 80 and the cycle step commands are applied by way of line 82 to a display select switch 84 which typically comprises a spring-biased push-button 86 biased in such a direction as to normally transmit the input code signals on line 80 to a three-digit, numerical display unit 88. The unit 88 may take a variety of forms including Nixie tubes, liquid crystal displays, cathode ray tube display, and so forth. Its function is to display in three digits a coded representation of the input codes as they are generated and applied by the sequence programmer 26 to the comparator 46. The three-digit display 88 is typically used by the operator in conjunction with a look-up table 19 which may take the form of one or more sheets of listed input codes and advisories which more fully explain the significance and/or functions required in connection with the input codes generated by the three-digit display 88. The display select switch 84 may be moved by manually depressing the push-button 86 over to the terminal contact of the cycle step command line 82 to display the more specific cycle step commands generated in sequence following the typical input code. Accordingly, the three-digital display device 88 is capable of presenting advisories in a two-level mode, the input codes presenting general information and the cycle step command codes presenting specific information regarding the actual-machine function which is being performed or which should be performed at a given time. In any event, the display 88 presents the last generated code, whether it be an input code or a cycle step command; therefore, upon occurrence of a code sequence interruption, the last presented code represents the function which is either being performed or should be performed by the grinder machine. If the last presented input code does not fully advise the operator of his diagnosis, repair, or progress steps, he switches to the cycle step command for more specific information.

Summarizing, it can be seen that the sequence control section 10 produces a sequence of coded signals in accordance with the program in the read-only memory programmer 26 to (1) direct the machien to execute specific functions by way of the output section 12, (2) compare input codes to signals which are generated by the actual performance of machine functions, as indicated by signals from section 14, (3) advance the sequence, if the input codes from programmer 26 compare to the input codes from the input section 14, and (4) display the status of the machine functions and machine function commands at all times by way of the three-digit display 88.

Figure 2:
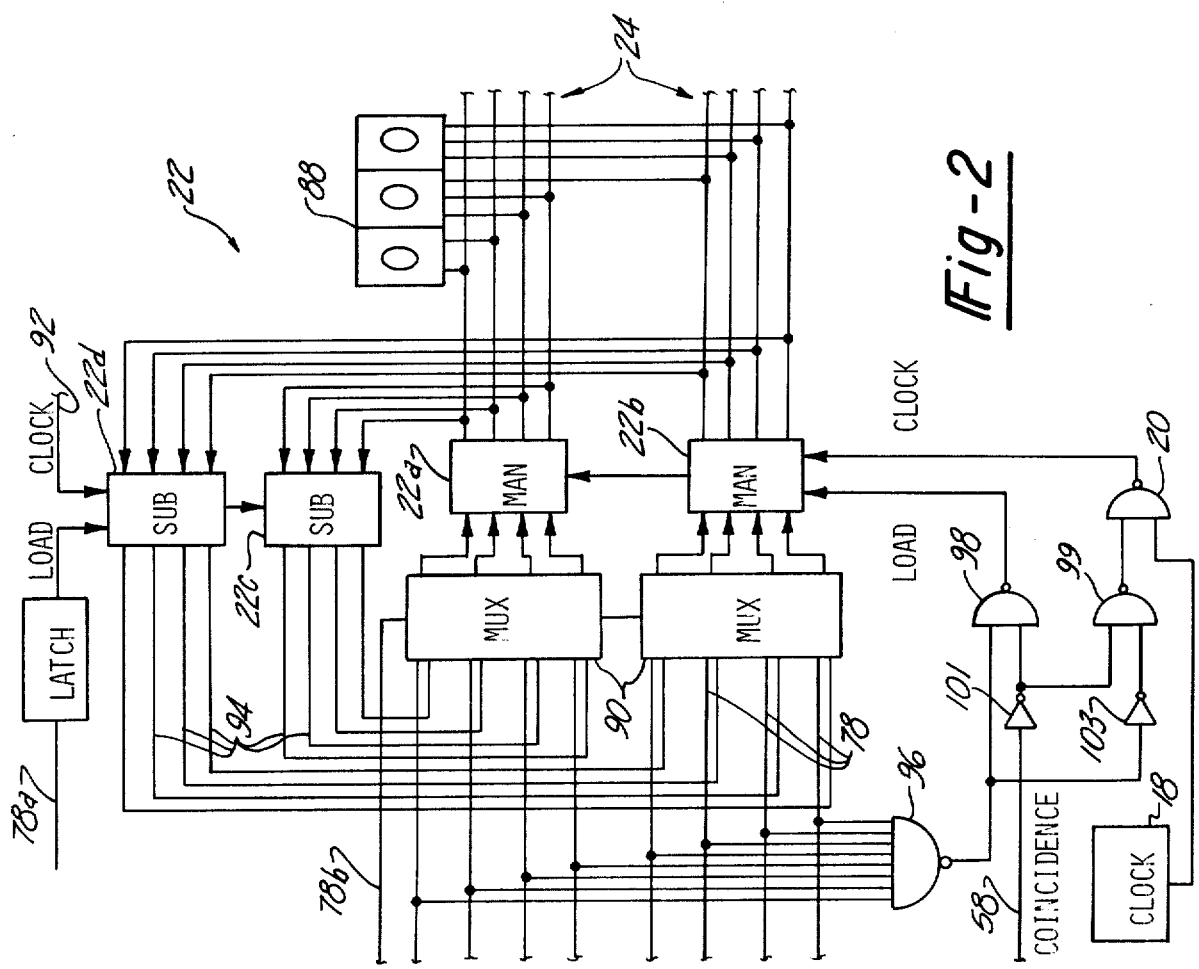
FIG. 2 is a block diagram partly in schematic detail of the counter circuit which is part of the diagram of FIG. 1.

Referring to FIG. 2, the details of the counter circuit 22 in the system of FIG. 1 will be described. Counter 22 comprises a main storage portion consisting of two, identical four-bit counters 22a and 22b, and a temporary storage section consisting of two identical four-bit counters 22c and 22d. The counters 22a and 22b are connected to receive the clock signals from clock 18 through AND gate 20 upon the occurrence of both "advance" signals on input line 58 and an output from gate 96 which is connected to receive the parallel lines of bus 78. Gates 98 and 99 and inverters 101 and 103 establish a signal transfer relation between the counter "jump" signal on line 78, the advance signal on line 58 and the "load" and "clock" inputs to counter portions 22a and 22b according to the following truth table:

| ADVANCE | G96 | G98 | G99 |
|---------|-----|-----|-----|
| 1 | 1 | 0 | 1 |
| 1 | 0 | 1 | 0 |
| 0 | 1 | 1 | 0 |

-continued

```
0      0      0      1
```

Signals applied by the main memory counters 22a and 22b to the display unit 18 are also applied to the temporary storage counters 22c and 22d. However, in the absence of a sub-routine load signal on address line 78a, no actual signal retension occurs and the temporary storage counters 22c and 22d remain substantially empty.

In the event a subroutine address or "jump" signal appears on lines 78 from the sequence programmer 26 along with a subroutine load signal on line 78a, the last-generated cycle step command from counter 22a, 22b is loaded into temporary storage counters 22c and 22d and incremented or advanced by one by the clock signal on line 92 so that as the stored cycle step command signal is transferred back to the counter 22a, 22b at the end of the non-numerically sequential subroutine, it will be "up to date". At the same time, the signals on lines 78 actuate multiplexers 90 to cut off communication between the counters 22c and 22d and the main storage counters 22a and 22b by way of the return line 94. Accordingly, the signals on lines 78 are loaded into counters 22a and 22b for application to the sequencer programmer 26 and for application to the display.

Figure 3:
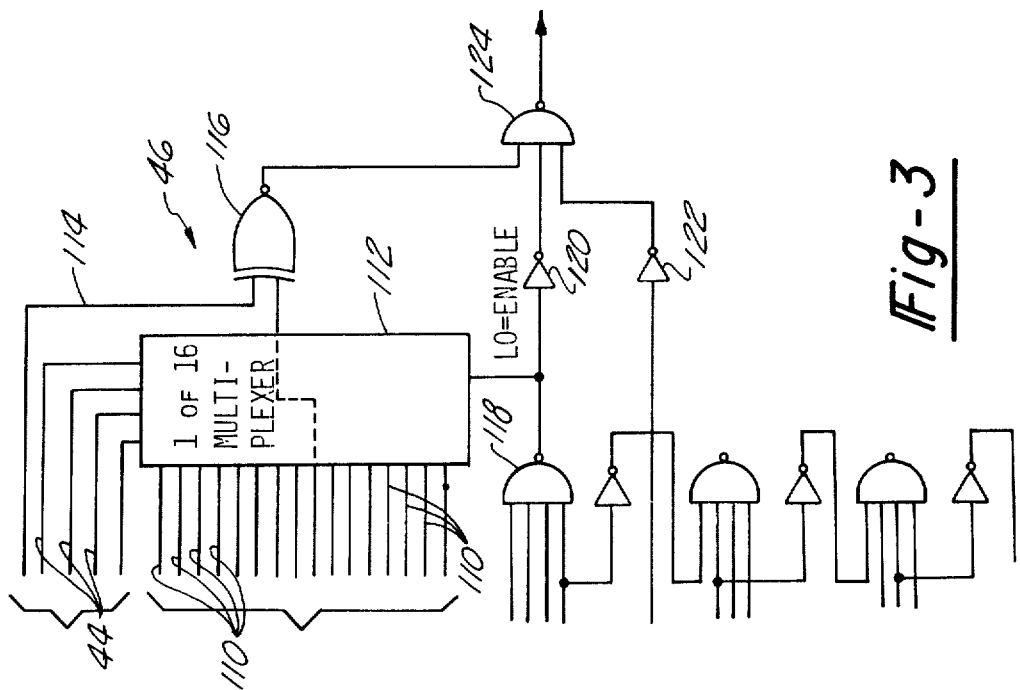
FIG. 3 is a block diagram partly in schematic detail of a comparator circuit in the arrangement of FIG. 1.

Referring now to FIG. 3, the details of the input selector and comparator unit 46 from FIG. 1 will be described in greater detail.

As indicated with reference to FIG. 1, the function of unit 46 is to compare input codes representing "requirements due" to signals representing contemporaneous "requirements met" and to generate an "advance" signal on line 58 if the two signals agree. Unit 46 comprises a multiplexer-selector 112 connected to receive as inputs the lines 110 from the input converters. The particular line 110 selected is a function of the input code on lines 44 from the sequence programmer 26. The output of selector 112 is connected as the B input to gate 116. The A input to gate 116 is a signal, either high or low, representing the most significant bit or sign bit of the particular input code; i.e., some input codes call for a high sign on the signal from the input converter and others call for a low sign to represent the requirement met. The sign bit appears on line 114 from the programmer 26. The truth table for gate 116 is as follows, the C signal being the output of the gate:

```
A      0      1      0      1
B      0      0      1      1
C      1      0      0      1
```

Gate 118 receives four more significant bits of the input code from sequencer 26 to identify the particular area of the unit 46 to be enabled; i.e., many comparator-selectors such as 112 may be required in a large machine. The output from gate 118 is inverted at 120 and applied to output gate 124. A low output from 124 indicates coincidence; hence, the need for inverter 130 in the signal line to delay 62 in FIG. 1. Inverter 122 receives an expander signal from other comparator cards. When all inputs to gate 124 are high, a low output condition is produced to indicate the advance is permitted.

Figure 4:
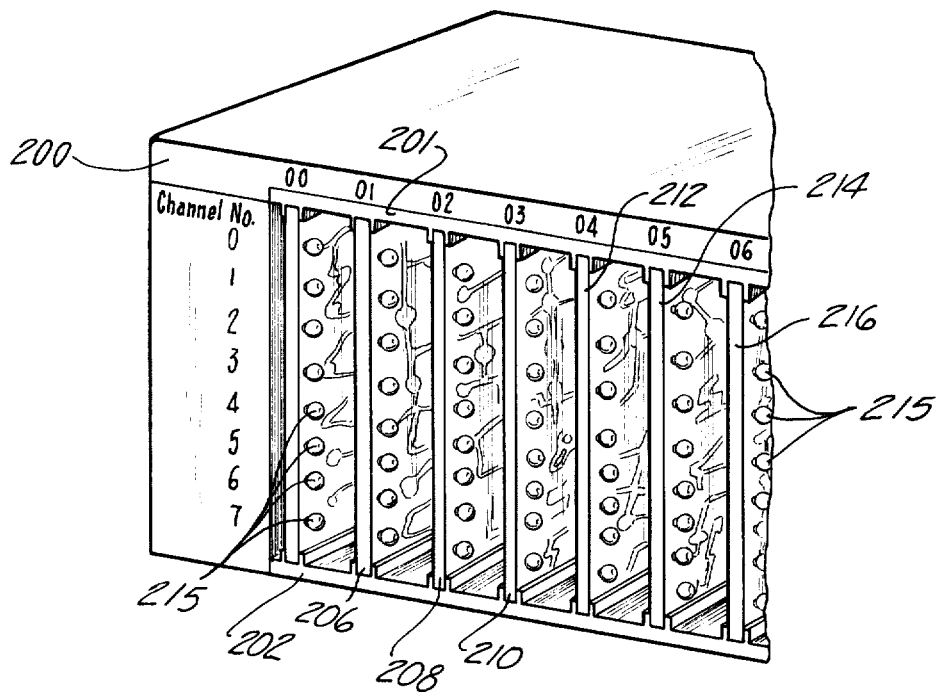
FIG. 4 is a simplified representative drawing of a circuit card organization and display scheme in accordance with the present invention.

Referring now to FIG. 4, a further feature of the diagnostic capabilities of the subject invention will be described. FIG. 4 illustrates a portion of the electronics support cabinet 200 having upper and lower slide-in circuit board connectors 201 and 202 disposed in spaced parallel relationship to one another within the cabinet 200. Connectors 201 and 202 are adapted to receive a plurality of rigid circuit boards 204, 206, 208, 210, 212, 214, and 216 each carrying the printed circuit and active components of a given electronics module; for example, one or more discrete subsystems or subassemblies in the control circuitry of FIG. 1. Circuit board 204 comprises eight channels numbered 0 through 7 which may, for example, represent eight input converters in input section 14 of FIG. 1. By way of further example, circuit board 206 also having eight channels may represent eight of the output converters of output section 12 of FIG. 1. It will further be noted that each circuit board is assigned a "card number"; e.g., circuit board 204 is assigned card number 00, circuit board 206 is assigned card number 01, circuit board 208 is assigned card number 02, and so forth. The channels of the various circuit boards are also numbered along the vertical axis to the left side of the cabinet opening, the channel numbers being aligned with the physical position of the neon lamps 215 which are physically mounted on the circuit boards 204 etc. The neon lamps 215 shown in FIG. 4 correspond to the neon lamps 42 and 76 which are shown as specific examples in FIG. 1. Accordingly, the lamps 215 are lighted or unlighted in accordance with the actuated or nonactuated status or condition of the electronic subsystem which is represented thereby.

The card number and channel number code of the physical mounting apparatus of FIG. 4 is selected to correlate with the cycle step numbers which are displayed by way of the three-digit display 88. Accordingly, the display of cycle step number 015 indicates that the cycle step command calls for the energization of the electrical subsystem whose circuit is carried in channel number 5 of card number 01 (also card number 206 in FIG. 4). This light should be lighted to indicate that the circuitry at this card location is active. If it is lighted, but the machine function represented by the cycle step number is not being executed, then the fault, in all probability, lies in some mechanical feature of the machine. If, on the other hand, the lamp is not lighted but the cycle step number is nevertheless being displayed, the machine malfunction lies, in all probability, with the circuitry and circuit card 206 must be replaced. In this fashion, diagnosis is facilitated.

As a further operating feature, the representation of a nonactuated card condition for a given cycle step command may be represented by adding 400 to the cycle step number displayed by way of unit 88. Thus, the display of 415, rather than 015, would indicate that the lamp in channel 5 of card number 206 sould be unlighted by generation of the cycle step command. Other equivalent approaches may also be followed.

The look-up sheet 19 may include information as to input codes, cycle step commands, and advisories according to the following format:

| DIAGNOSTICS INPUT CODE | CYCLE STEP | THE CONTROL SYSTEM IS WAITING FOR THE FOLLOWING: |
|---|---|---|
| 001 | | 2LS Should Be Actuated By Cams At Rough Or Finish Grind Position - Check Cycle Step |
| | 103 | Rough Grind |
| | 154 | Finish Grind |
| | 324 | Cam Position Check During Cam Reset |
| | 350 | Continuous Dress |
| | 365 | New Wheel Dress |
| 002 | | 3LS Should Be Actuated By Cams At Dress Start Or Chuck Open Position - Check Cycle Step |
| | 127 | Auto Cycle Dress |
| | 310 | Chuck Open During Cycle |
| | 323 | Cam Position Check During Cam Reset |
| | 325 | Chuck Open During Cam Reset |
| | 352 | Continuous Dress |
| | 367 | New Wheel Dress |
| 003 | | 1LS Should Be Actuated By Cams At Start Of New Wheel Dress Stroke Or Close Chuck Position - Check Cycle Step |
| | 066 | Start Dress Position During New Wheel Dress |
| | 201 | Load Stroke Check Position During Cycle |
| | 327 | Load Stroke Check Position During Cam Reset |
| | 356 | Continuous Dress |
| 004 | | 9LS Should Be Actuated By Loader Entering Chuck - Check Cycle Step |
| | 267 | Unloading Part After Grind |
| | 330 | Unloading Part After Cam Reset |
| 012 | | Waiting For Master Start Pushbutton - Check Cycle Step |
| 000 | | Initial Startup After Closing Disconnect |
| | 215 | Waiting For New Wheel To Be Installed |
| | 224 | Broken Wheel Or No Part In Chuck |
| | 313 | Unloader Arm Jammed |
| | 321 | Limit Of Size Correction - Reset The Dresser, Or Change Size Correction Limits |
| 015 | | Wheel Should Be Running |
| 016 | | Work Should Be Running |
| 017 | | Waiting For Cycle Start Button |
| ... | | |
| 101 | | Waiting For 5M Starter To Pull In To Start Dress Motor |
| 102 | | Waiting For Brake Timer (Card 22) |
| 103 | | Controller Scanning - Check Cycle Step |
| | 050 | Waiting For Feed To Reach New Wheel Install Position |
| | 105 | Rough Quick Approach - Waiting For Feed Position Or Stock Censor |
| | 112 | Rough Grind One |
| | 121 | Waiting For Rough Sparkout Timer Or API Meter To Drop To Rough Sparkout Level |
| | 167 | Finish Sparkout |
| | 273 | Waiting For 4LS or 5LS During Cam Reset |
| 104 | | Waiting For Feed To Reach New Wheel Install Position - Check Cycle Step |
| | 040 | Following Cycle Start |
| | 212 | Prior To Worn Wheel Shutdown |
| | 216 | Prior To Broken Wheel Shutdown |

An example of machine operation with reference to specific input codes and cycle step commands is given in a simplified way in the following paragraph.

The digital display unit 88 normally and regularly displays input codes to the operator. The typical input code display is an advisory regarding an operator function which must be performed before the counter 22 will advance to the next input code. The input code can, however, indicate that the machine function required is not met. All operations are started by pressing the "cycle start" switch push button 68. The need to press this button is always indicated by the display of input code 017. If pressing the cycle start button produces another input code display but does not start the machine, the operator looks to the input code sheet and performs the indicated function. For example, if pressing the cycle start button causes a 015 display, the operator looks to the look-up table 19 to determine that the wheel should be running. If it is not running, the operator presses the "start wheel" push button and then presses the cycle start button. The machine should start at this point. If it does not start, another input code will be displayed giving the operator further advice. It may, for example, indicate that the dresser wheel should be started. When all conditions are satisfied, pressing the cycle start button will start the machine and all functions are performed automatically from that time on, assuming no malfunction occurs. If the machine stops, the input code display might say, for example, 104. This means "waiting for feed to reach new wheel install position". This input code advisory on the look-up table sheet 19 also includes the very important advice "check cycle step". The operator then switches the selector switch 84 to the "cycle step" display position to draw data from the sequencer 26 to determine exactly what machine function is being called for. This may result in the display of a machine function which should be going on but which, because of a circuit failure or machine failure, is not occurring. The cycle step may also include dummy numbers to tell the operator to do something, like replacing a worn wheel. Once a shutdown occurs, the machine must be restarted by the operator in a step-by-step manner. For example, depletion of work pieces for automatic feed in causes the grinder wheel to be shut off and the wheel must be restarted, as described above, even after the new workpiece load has been placed in the input hopper.

It is to be understood that the invention has been described with reference to a specific embodiment and that various modifications may be made to the embodiment as described. Accordingly, the foregoing description is not to be construed in a limiting sense.

The embodiments of the invention in which an exclusive property or privilege is claimed are defined as follows:

1. In a sequence controller and diagnostic display system for a machine having means for performing a plurality of controlled functions in a cycle of programmed steps: means for producing a sequence of signals representing increments of advancement from one of said steps to another; sequence programmer means including data storage means connected to receive said signals for intermittently producing in response to each said signal a plurality of input codes defining known machine conditions to be met before performing subsequent steps and digital cycle step commands defining machine steps to be performed sequentially; means for advancing the means for producing said sequence of signals only as said machine conditions are met; and display means connected to selectively display coded digital representations of said cycle step commands and input codes as they are produced.

2. Apparatus as defined in claim 1 wherein said display means comprises visual indicator means and selector means connected to receive said cycle step commands and said input codes and to apply said commands and codes to said visual indicator means, said selector means being biased to normally apply to the indicator means the last input code received thereby, but manually actuable to apply to said indicator means the subsequent step command.

3. Apparatus as defined in claim 2 further including input signal generator means for generating discrete input signals representing respective machine conditions, said means for advancing comprising comparator means for comparing representations of selected ones of said input signals to said input codes and for generating a counter advance signal when the comparison indicates that the commanded conditions are met.

4. Apparatus as defined in claim 1 wherein said programmer means is responsive to certain of said cycle step commands to shift said counter to and from nonsequential cycle step command routines, said counter having means for holding the last sequential step command produced and for returning to the next sequential step command at the completion of the machine functions represented by the non-sequential step command routines.

5. Apparatus as defined in claim 4 wherein said counter comprises a main storage portion and a temporary storage portion, the main storage portion being connected to normally receive the sequence of cycle step commands, means for transferring sequential cycle step commands from the main portion to the temporary portion just prior to receipt of a non-sequential cycle step command, and means to transfer sequential cycle step commands back to the main portion after execution of the non-sequential cycle step command.

6. Apparatus as defined in claim 5 wherein the counter includes means for incrementing the transferred cycle step command code by one.

7. Apparatus as defined in claim 5 including clock means for advancing the counter at the clock rate but only as said machine conditions are met.

8. Apparatus as defined in claim 1 wherein said sequence programmer means comprises a read-only memory.

9. Apparatus as defined in claim 1 further including output decoder means connected to receive coded signals from the sequence programmer representing distinct machine function controllers to be actuated, and a plurality of machine function controllers connected to be selectively actuated by the output decoder means.

10. Apparatus as defined in claim 9 including a plurality of output converters connected between said machine function controllers and said output decoder means for converting the signals from the decoder means to a higher electrical power level.

11. Apparatus as defined in claim 3 further including input converter means connected between said input signal generator means and said comparator means for converting the signals from the input signal generator means to a lower electrical power level.

12. Apparatus as defined in claim 11 wherein said input converter means comprise a plurality of electrical circuit support means, each of said converter means having mounted on said support means a visual display device for indicating the actuated and nonactuated states thereof.

13. Apparatus as defined in claim 12 including container means for said circuit support means, the circuit support means being arranged in said container means in a code which corresponds to the visual representation of the cycle step commands applied to said display means.

14. Apparatus as defined in claim 10 wherein each of said output converters comprises circuit support means and a visual indicator means mounted on said support means for indicating the actuated and nonactuated states of the respective converters.

15. Apparatus as defined in claim 14 further including container means for said support means, said support means being physically organized within said container means in accordance with a code which is correlated to the cycle step command applied to the display means.

16. Apparatus as defined in claim 15 wherein said visual indicator means comprises a plurality of neon lamps.

17. Apparatus as defined in claim 11 wherein one of said input signal generators is a push button for initiating the generation of cycle step commands in said counter.

18. Apparatus as defined in claim 1 including display selector means connected to receive said cycle step commands and input codes, the display selector means including an output switch selectively connectable to transfer one of said cycle step commands and input codes to the display means.

19. Apparatus as defined in claim 1 further including means for providing a static display of readable advisories related to the input code numbers and cycle step command numbers displayed by said display means.

20. Apparatus as defined in claim 19 wherein said display means comprises a three-digit display.

21. In a machine function sequence controller for controlling the sequence of executed functions of a multi-function machine in accordance with a predetermined program: means for simultaneously generating a sequence of machine function instruction codes having performance significance to a human operator and machine function requirements codes which are to be met before advancing through said sequence, means connected to receive the requirement codes for execution of the machine functions represented thereby, means for simultaneously presenting a running visual display of the instruction codes as presented, said execution means including discrete subsections of electronic circuitry and support means therefor, the discrete subsections being physically arranged in accordance with a coordinate location convention correlated to the instruction code whereby the instruction code presented identifies the physical location of the electronics subsystem required to execute the code.

22. Apparatus as defined in claim 21 further including indicator means associated with the electronic subsystem for visually indicating the actuated and nonactuated status thereof.

* * * * *